United States Patent [19]

George

[11] Patent Number: 4,494,730
[45] Date of Patent: Jan. 22, 1985

[54] PLUG VALVE WITH IMPROVED PLASTIC SLEEVE

[75] Inventor: John A. George, Cincinnati, Ohio

[73] Assignee: Xomox Corporation, Cincinnati, Ohio

[21] Appl. No.: 437,956

[22] Filed: Nov. 1, 1982

[51] Int. Cl.$^3$ .............................................. F16K 5/02
[52] U.S. Cl. ..................................... 251/309; 251/314
[58] Field of Search ............... 251/309, 310, 311, 312, 251/314

[56] References Cited

U.S. PATENT DOCUMENTS

| | | | |
|---|---|---|---|
| 2,994,504 | 8/1961 | Reed, Jr. | 251/312 |
| 3,703,910 | 11/1972 | Smith | 251/309 |
| 3,825,030 | 7/1974 | Kalsi | 251/309 |
| 4,289,296 | 9/1981 | Krause | 251/306 |

FOREIGN PATENT DOCUMENTS 32038  7/1981  European Pat. Off. ............ 251/310

Primary Examiner—Martin P. Schwadron
Assistant Examiner—James R. Shay

Attorney, Agent, or Firm—Kinney and Schenk

[57] ABSTRACT

A plug valve and method of making same are provided wherein the valve has an outer housing and a flow passage extending through the housing and including an inlet and an outlet interconnected by a bore therebetween. A plastic sleeve is disposed within the housing and lines the bore and such sleeve has a pair of aligned ports therein which are aligned with the inlet and outlet. A rotatable plug is disposed within the sleeve and such plug has an opening therethrough which is adapted to be rotated in and out of registry with the inlet and outlet. The sleeve has substantially rigid reinforcing means embedded therein around its ports which serve the multiple purpose of preventing cold flow of the sleeve adjoining the ports, minimizing fluid erosion of portions of the sleeve adjoining the ports, and increasing the rigidity of the sleeve around each of the ports whereby with fluid flow through the valve at high velocity with the plug rotated to a partially closed position any tendency for the plastic sleeve to be partially moved into the flow passage is substantially eliminated.

10 Claims, 13 Drawing Figures

PLUG VALVE WITH IMPROVED PLASTIC SLEEVE

BACKGROUND OF THE INVENTION

1. Field of the Invention

This invention relates to a plug valve and to a method of making such valve.

2. Prior Art Statement

It is known in the art to provide a plug valve for controlling fluid flow therethrough with such valve having an outer housing or body which has a flow passage extending through the housing and including an inlet and an outlet interconnected by a bore disposed therebetween. The bore has a central axis disposed substantially perpendicular to the flow passage and a plastic sleeve is disposed within the housing and lines the bore. The plastic sleeve has a pair of aligned ports therein at diametrically opposed locations and the ports are aligned with the inlet and outlet to enable fluid flow through the passage. In such a plug valve a rotatable plug member or plug is disposed within the sleeve and the plug has an opening therethrough which is adapted to be aligned in and out of registry with the inlet and outlet in accordance with rotation relative to the housing. In such a prior valve, the plastic sleeve provides the primary fluid seal for the valve. Further, the holding means generally consists of what will be referred to as body lips defined as an integral part of the valve body and such lips are associated with the inlet and outlet in the housing. The lips of a typical known valve shield the plastic sleeve liner from direct impingement of fluid flowing through the valve and protect it from any abrasive material entrained in the fluid. The body lips help prevent cold flow of the sleeve liner and prevent rotation of the sleeve liner relative to the valve body whenever the plug member is rotated between open and closed positions.

It is common practice in such a prior plug valve to use a sleeve liner of polytetrafluoroethylene or equivalent material and with such a sleeve liner there is a strong tendency for the liner to be drawn or deflected toward the center line of the valve when the rotatable plug member is in a partially or nearly closed position. When the plug member is in this nearly closed position, the velocity of the fluid proximal to the side of the port is markedly increased with a resultant decrease in pressure, whereby this reduction in pressure tends to provide movement of the plastic sleeve into the flow passage by pulling, dislocation, or deflection. The body lips also serve to prevent such movement of the plastic sleeve under these flow conditions.

In the past, these body lips have been made as an integral part of the valve outer housing or body, as by casting. However, the casting of these lips in the valve body increases the manufacturing cost of such valve body and makes machining of the valve body very expensive. Further, in a valve housing or body having body lips, it is very difficult to precisely machine exposed sleeve engaging surfaces of the usual high pressure sealing ribs of the plug valve to assure proper sealing of the valve due to the difficulty in providing a machining action with the body lips present. In addition, the body lips also cause problems in the assembly of the plastic sleeve liner in the valve body and these problems add to the cost of the overall prior art plug valve.

It is also common practice with prior art plug valves to replace the entire outer housing or body once the body lips become damaged or defective. However, once a plug valve is in field service, such replacement is often difficult. Moreover, the special tooling and manufacturing techniques required in the assembly of a sleeve type liner in a valve body having body lips make in-field replacement of the sleeve type liners very difficult.

In view of the above, it is clear that prior art plug valves have numerous deficiencies.

SUMMARY OF THE INVENTION

This invention provides an improved plug valve for controlling fluid flow therethrough which overcomes the above-mentioned deficiencies. The improved plug valve has an outer housing or body which has a flow passage extending through the housing and including an inlet and an outlet interconnected by a bore disposed therebetween. The bore has a central axis disposed substantially perpendicular to the flow passage and a plastic sleeve is disposed within the housing and lines the bore. The plastic sleeve has a pair of aligned ports therein at diametrically opposed locations and the ports are aligned with the inlet and outlet to enable fluid flow through the passage. In such a plug valve a rotatable plug is disposed within the sleeve and the plug has an opening therethrough which is adapted to be aligned in and out of registry with the inlet and outlet in accordance with rotation of the plug relative to the sleeve and housing. The plug valve also has means for holding the sleeve against rotation relative to the housing.

In accordance with one embodiment of the improved plug valve of this invention the sleeve has substantially rigid reinforcing means embedded therein around the ports with the reinforcing means serving the multiple purpose of preventing cold flow of the sleeve adjoining the ports, minimizing fluid erosion of portions of the sleeve adjoining the ports, and increasing the rigidity of the sleeve around each of the ports such that with fluid flow through the valve at high velocity and with the plug rotated to a partially closed position any tendency for the sleeve to be partially moved into the flow passage is substantially eliminated.

Accordingly, it is an object of this invention to provide an improved plug valve of the character mentioned.

Another object of this invention is to provide an improved method of making a plug valve of the character mentioned.

Other features, objects, uses, and advantages of this invention are apparent from a reading of this description which proceeds with reference to the accompanying drawings forming a part thereof.

BRIEF DESCRIPTION OF THE DRAWINGS

The accompanying drawings show present preferred embodiments of this invention, in which.

DETAILED DESCRIPTION

Figure 2:
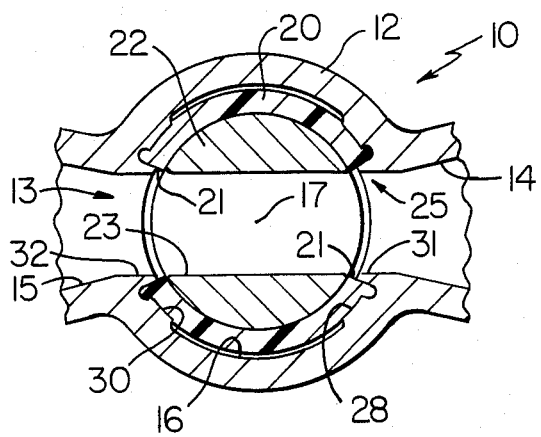
FIG. 2 is a cross-sectional view of a prior art plug valve.

Reference is now made to FIG. 2 of the drawings which shows a prior art plug valve 10 in a cross-sectional view, and such plug valve 10 is provided for controlling fluid flow therethrough.

The valve 10 has an outer body portion or housing 12 and a flow passage 13 extending through the housing and including an inlet 14 and an outlet 15 interconnected by a bore 16 disposed therebetween. The bore 16 has a central axis 17 disposed substantially perpendicular to the flow passage 13.

The valve 10 also has a plastic sleeve 20 disposed within the housing and lining the bore 16 and the sleeve has a pair of aligned ports therein at diametrically opposed locations and each port is designated by the same reference numeral 21 and is defined by annular edge surface means. The ports 21 are aligned with the inlet 14 and outlet 15 to enable fluid flow through the passage 13.

A rotatable plug 22 is disposed within the sleeve 20 and the plug has an opening 23 therethrough which is adapted to be aligned in and out of registry with said inlet 14 and outlet 15 in accordance with rotation of the plug 22 relative to the sleeve 20 and housing 12. The plug valve also has means holding the sleeve 20 against rotation relative to the housing 12 and such means is designated generally by the reference numeral 25.

The plug 22 is rotatable about the axis 17 (which extends perpendicular to the plane of the FIG. 2 illustration); and, rotation may be achieved using means which are well known in the art. The plastic sleeve 20 may be formed of polytetrafluoroethylene, for example, and is fitted concentrically around the rotatable plug 22 and interposed between the plug 22 and the housing 12.

A pair of body pressure ribs 28 and 30 circumscribe the inlet and outlet ports 14 and 15 respectively and extend radially into the bore 16 to provide high pressure sealing areas for the plug 22. Primary sealing in the valve 10 occurs between the rotatable plug 22 and the sleeve 20 opposite the high pressure ribs 28 and 30.

The sealing of a valve using high pressure ribs is well known in the art and is described in detail in U.S. Pat. No. 2,994,504, whereby further description thereof will be omitted in the interest of brevity. The description in this patent is incorporated herein by reference thereto.

Interposed between the high pressure ribs 28 and 30 and their respective inlet and outlet ports 14 and 15 are what will be referred to as body lips 31 and 32 with lip 31 circumscribing inlet port 14 and lip 32 circumscribing the outlet port 15. These lips 31 and 32 define the previously mentioned holding means 25 and such lips serve to protect the sleeve and to prevent it from rotating relative to the body 21 when the plug 22 is rotated about the axis 17. The lips 31 and 32 also overcome the tendency of the sleeve 20 to pull toward the center of the bore 16, especially when the plug member 22 is in a nearly closed position and high velocity fluid is flowing about the inlet 14 of the valve 10. The high velocity fluid flow generally results in a correspondingly low pressure at the high velocity flow location and in the absence of holding means such as lips 31 and 32 the sleeve 20 would frequently be pulled out of position at the high velocity flow location proximal the inlet 14 when the plug valve is rotated to the nearly closed position. The lips 31 and 32 also protect the sleeve 20 from direct contact with the fluid flowing through the valve 10 and from abrasive materials which may be contained therein. The prior art body lips 31 and 32 are intricately formed in the body 12 and require special fabricating techniques. These lips 31 and 32 are also difficult to produce and thus have added greatly to the cost of the valve body 12. In addition, the lips 31 and 32 represent the most vulnerable part of the valve body 12, from a damage viewpoint. After the valve 10 has been placed in field service, damage to the lips 31 and 32 is most difficult and sometimes impossible to repair, whereby any damage thereto often necessitates replacement of the entire valve body 12.

The above description of the prior art plug valve 10 shown in FIG. 2 has been presented to highlight the structure of such prior art valve. However, the disclosure will now proceed with a detailed description of the plug valve of this invention; and, for this description reference is now first made to FIG. 1 of the drawings.

The plug valve of this invention is also for controlling fluid flow therethrough and such valve is designated generally by the reference numeral 35. The valve 35 has an outer body portion or an outer housing 36 and a flow passage which is designated generally by the reference numeral 37 which extends through the housing and includes an inlet 40 and an outlet 41 interconnected by bore 42 disposed therebetween. The bore has a central axis 44 which is disposed substantially perpendicular to the flow passage 37 and a plastic sleeve 45 is provided and disposed within the housing 36 and lining the bore 42 in such housing 36.

The sleeve 45 has a pair of aligned ports provided therein and each port is designated by the same reference numeral 46. The ports 46 are provided in the sleeve 45 at diametrically opposed locations and each port 46 is defined by what will be referred to as annular edge surface means 47. The ports 46 are aligned with the inlet 40 and outlet 41 to enable fluid flow through the flow passage 37.

The valve 35 also has a rotatable plug 50 which is disposed within the passage 37 and such plug has an opening 51 therethrough which is adapted to be aligned in and out of registry with the inlet 40 and outlet 41 in accordance with rotation of the plug 40 relative to the plastic sleeve 45 and the housing 36. The valve 35 also has means designated generally by the reference numeral 52 in FIG. 1, at certain typical locations, for holding the sleeve 45 against rotation relative to the housing 36 and such means will be described in detail subsequently.

Figure 1:
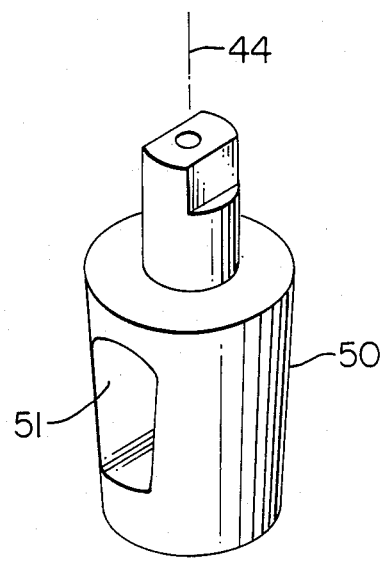
FIG. 1 is an exploded isometric view with parts in cross section and parts broken away of one exemplary embodiment of the plug valve of this invention.
Figure 1:
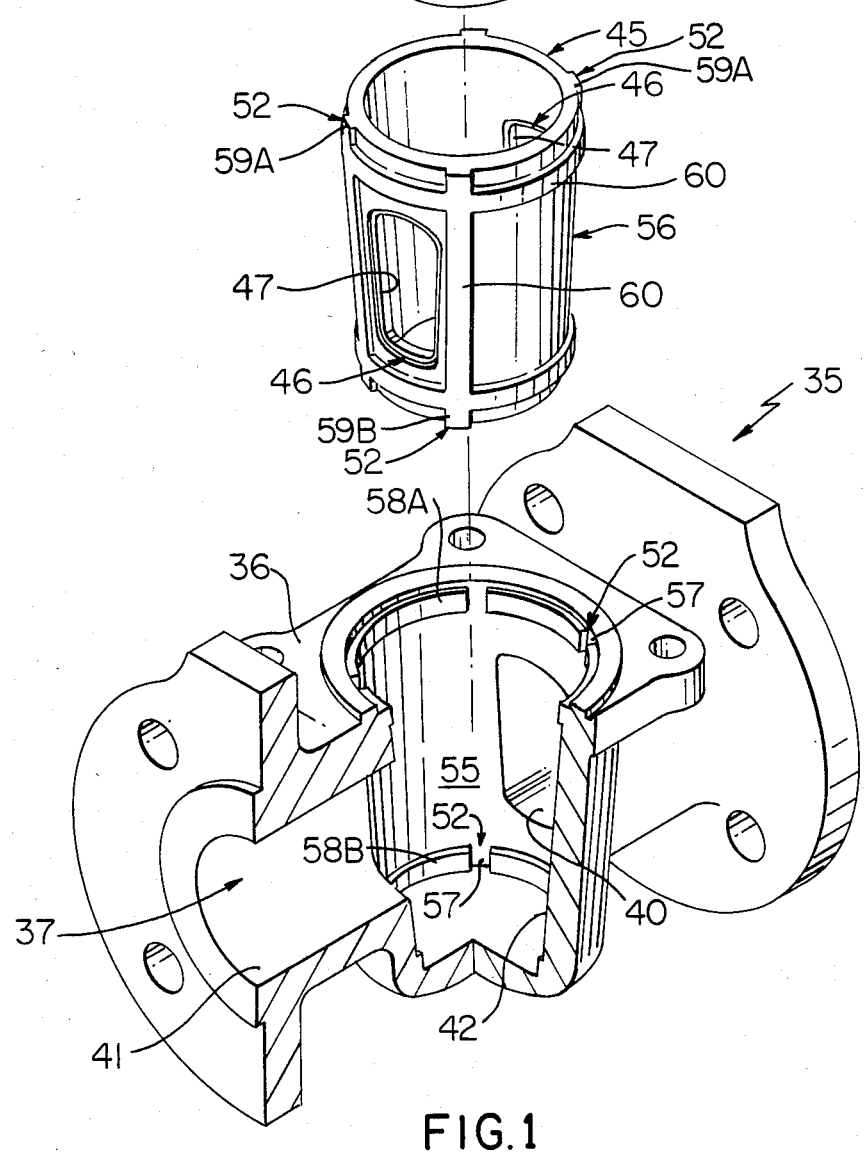

The plastic sleeve 45 of the valve 35 has substantially rigid annular reinforcing means embedded therein around the ports 46; and, the reinforcing means in the sleeve 45 of FIG. 1 are illustrated in FIGS. 3 through 6 and comprise a pair of substantially rigid metal reinforcements each designated by the same reference numeral 54 around each port 46. The reinforcing means or metal reinforcements 54 serve to increase the rigidity of the plastic sleeve 45 around the ports 46 such that with fluid flow through the valve 35 at high velocity and with the plug rotated to a partially closed position (i.e. a portion of the plug opening 51 is exposed in the passage 37) any tendency for the plastic sleeve 45 to be partially moved into such flow passage 37 is substantially eliminated. The reinforcing means or metal reinforcements 54 embedded in the sleeve 45 also serve to prevent cold flow of the plastic sleeve material adjoining the ports 46 and also minimize fluid erosion of portions of the plastic sleeve 45, i.e., the plastic material of the sleeve, adjoining the ports.

Referring again to FIG. 1 of the drawings, it is seen that the housing 36 has an inside surface 55 and the sleeve 45 has an outside surface 56. One of the surfaces, 55 or 56, has groove means therein and the other of such surfaces has cooperating projection means extending therefrom.

In this example of the invention the groove means is provided as grooves 57 extending radially in said housing from the top and bottom portions of the inside surface 55. In particular, the housing 36 has a top annular ledge 58A and a bottom annular ledge 58B and the exposed surfaces of such ledges 58A and 58B comprise the inside surface 55. The grooves 57 are provided in angularly spaced relation in each ledge 58A and 58B whereby such grooves thus extend radially in said housing from the top and bottom portions of the inside surface 55. The grooves 57 in ledge 58A are vertically aligned with corresponding grooves 57 in ledge 58B and (except for the taper of bore 42) each groove 57 in ledge 58A is aligned substantially coaxially with an associated groove in ledge 58B.

The sleeve 45 of this example has projection means or projections extending therefrom both circumferentially and vertically or axially and for convenience each projection is designated by the same reference numeral 60.

In installing the sleeve 45 within the housing 36 of the valve 35, the sleeve 45 is adapted to be expanded and formed radially so that a portion of the projection means or portions of the projections 60 are disposed within the grooves 57. In this example the portion of the projection means or projections disposed in the grooves 57 is defined by four axially or vertically aligned projecting portions 59A and 59B. Once the four portions 59A and 59B are disposed within the four corresponding vertical grooves 57 rotation of the sleeve 45 relative to the housing 36 is prevented. Thus, the vertically or axially disposed grooves 57 and projecting portions 59A and 59B define the previously mentioned holding means 52.

It will also be appreciated that the dimensional configurations and tolerances of the grooves 57 and projecting portions 59A and 59B are such that the portions 59A and 59B readily fit within the grooves 57. Further, the reference to the projecting portions 59A and 59B and grooves 57 being axially or vertically disposed is intended to highlight that these members are also substantially parallel to the central axis of the bore 42 in the housing 36, sleeve 45, and plug 50.

In the valve 35 of this invention the projection means or projections 60 comprise two sets of pressure ribs in the sleeve 45 and are defined such that one set surrounds or circumscribes the inner part of the inlet 40 and the other set surrounds or circumscribes the inner part of the outlet 41. In particular, the projections 60 at one location on the sleeve 45 are disposed in surrounding relation about one port 46 and with the sleeve 45 in position in the housing 36 define an annular rib structure, or one set of pressure ribs, of rectangular outline associated with and surrounding the inner part of the valve inlet 40. Similarly, the projections 60 at a location diametrically opposite the one location on the sleeve 45 are disposed in surrounding relation about an opposite port 46 and with sleeve 45 in position in the housing 36 define an annular rib structure, or a second set of pressure ribs, also or rectangular outline associated with and surrounding the inner part of the valve outlet 41. The annular rib structures thus defined serve the same purpose and provide primary sealing of the valve 35 between the rotatable plug 50 thereof and the sleeve 45 around the annular pressure ribs in a similar manner as occurs between plug 22 and sleeve 20 opposite the pressure ribs 28 and 30 of the prior art valve 10.

Figure 3:
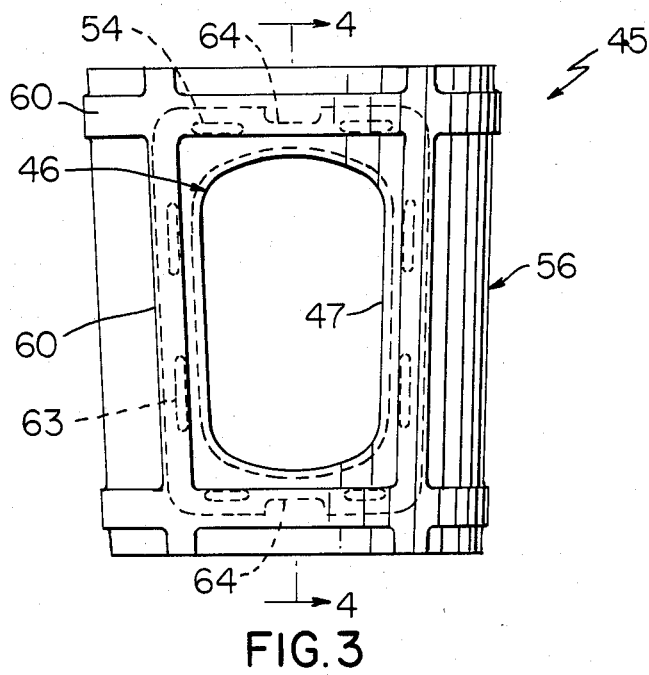
FIG. 3 is an enlarged view in elevation of the plastic sleeve illustrated in FIG. 1 and by dotted lines illustrating reinforcing means employed in such sleeve.
Figure 5:
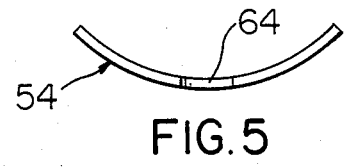
FIG. 5 is a top view of a typical reinforcing means which is utilized around one of the ports in the plastic sleeve of FIG. 3.
Figure 4:
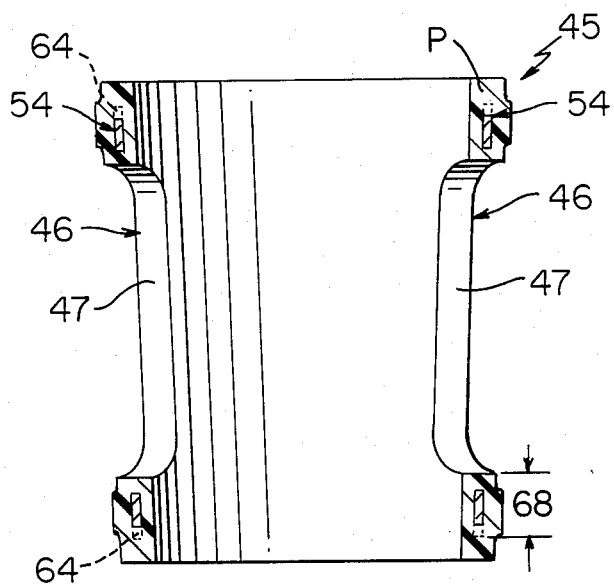
FIG. 4 is a cross-sectional view taken essentially on the line 4—4 of FIG. 3.

As will be readily apparent from FIG. 3 of the drawings the reinforcing means or metal reinforcement 54 surrounding each associated port 46 in the sleeve 45 extends within the sleeve in all directions from each port 46 such that each reinforcement around each port substantially overlaps an associated annular rib structure defined in the sleeve 45. With this configuration each metal insert, in essence, reduces the thickness of the plastic sleeve which is compressed in the regions associated with each annular rib structure whereby the contact stresses are higher for a give interference of the plug 50 with the sleeve 45. In this manner maximum contact and sealing stresses may be achieved in the primary sealing areas of the annular rib structures directly surrounding the ports with lower contact sealing stresses being achieved in the secondary sealing regions or areas. Accordingly, the forces on the plug 50 and torque which must be applied to rotate such plug can be minimized for a given sealing stress in the primary sealing region.

The metal reinforcements 54 are substantially identical and each metal reinforcement 54 is in a radially expanded configuration in the position thereof illustrated in FIG. 3. This is due to the fact that each embedded metal reinforcement 54 and its sleeve 45 have been expanded after disposing the sleeve 45 within the bore 42. This expansion of such sleeve 45 with its reinforcements 54 embedded therewithin is achieved as is known in the art using conventional expanding tools. In addition, this expanding action enables sizing of the sleeve to mate precisely with the inner portions of the valve housing. This technique reduces manufacturing costs because it reduces the need to hold several mating parts to precise tolerances as is required in many prior art plug valves.

Figure 6:
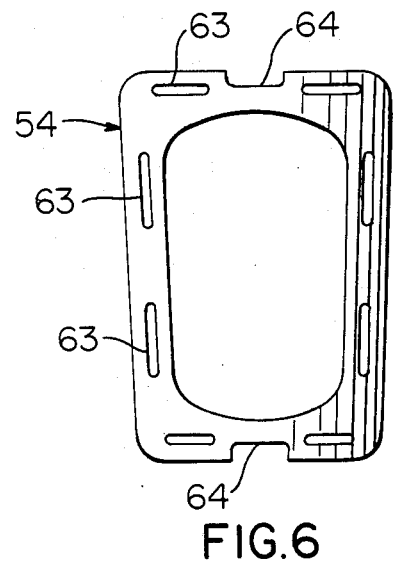
FIG. 6 is a view looking perpendicularly toward the convex portion of the reinforcing means illustrated in FIG. 5.

The reinforcement 54 is shown prior to embedment in FIG. 6 of the drawings and such metal reinforcement has an annular configuration of roughly rectangular outer peripheral outline and a plurality of apertures 63 provided therein together with cutout notches 64. The apertures 63 of this example are elongated and notches 64 are particularly adapted to receive portions of the plastic matrix material P comprising the sleeve 45 therethrough, also see FIG. 4, during molding of forming of the sleeve 45 to thereby firmly embed the metal reinforcement in position in such plastic material P of such sleeve.

Each metal reinforcement 54 has a particular cross-sectional configuration when viewed on any cross section extending radially from approximately the annular inside surface means 47 of an associated port 46 in the sleeve 45. In the illustration of FIGS. 3 through 6 the particular cross-sectional configuration of the metal reinforcement 54 is generally rectangular and the metal reinforcement 54 is embedded within the sleeve and is spaced with its remote peripheral edge inwardly into the plastic sleeve from the annular surface means 47 by a distance 68.

Figure 7:
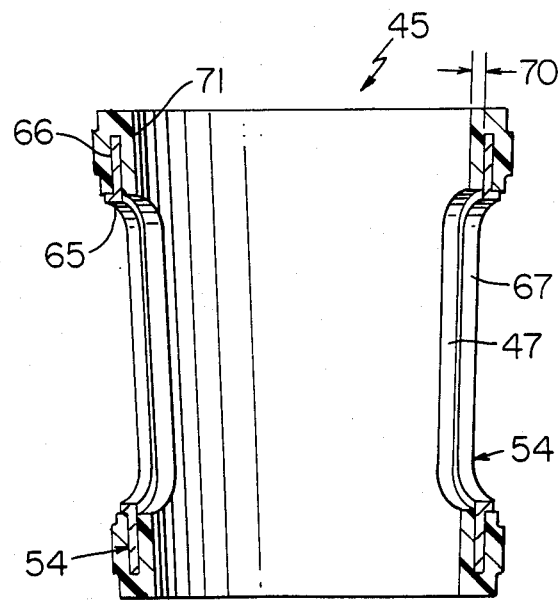
FIG. 7 is a view similar to FIG. 4 illustrating another exemplary embodiment of reinforcing means in a sleeve which may be used interchangeably with the sleeve of FIG. 3.
Figure 8:
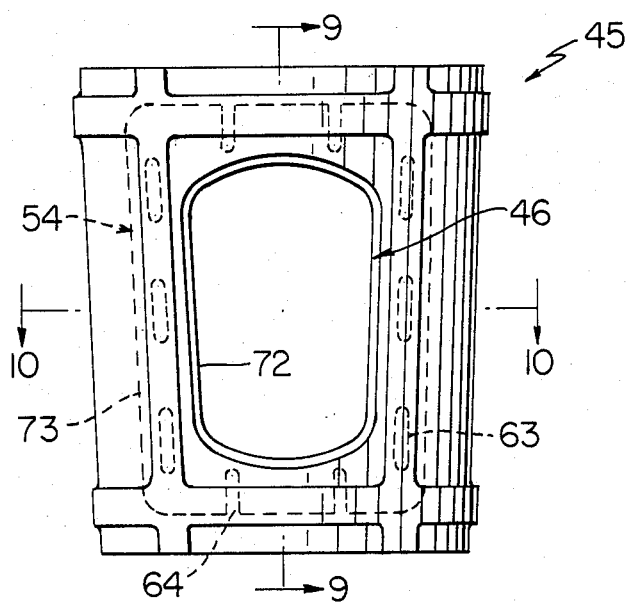
FIG. 8 is a view similar to FIG. 3 illustrating a plastic sleeve having a modification of reinforcing means which may be used interchangeably with the sleeve of FIG. 3.
Figure 11:
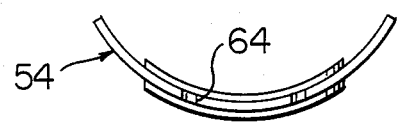
FIG. 11 is a view similar to FIG. 5 illustrating the reinforcing means utilizing the sleeve of FIG. 8.
Figure 12:
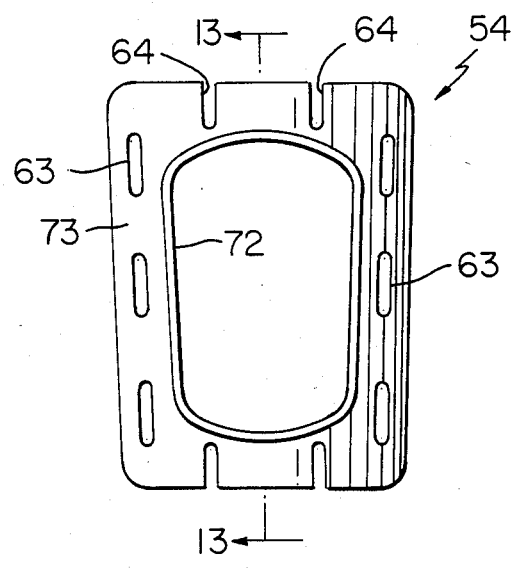
FIG. 12 is a view similar to FIG. 6 of the reinforcing means of FIG. 11.
Figure 9:
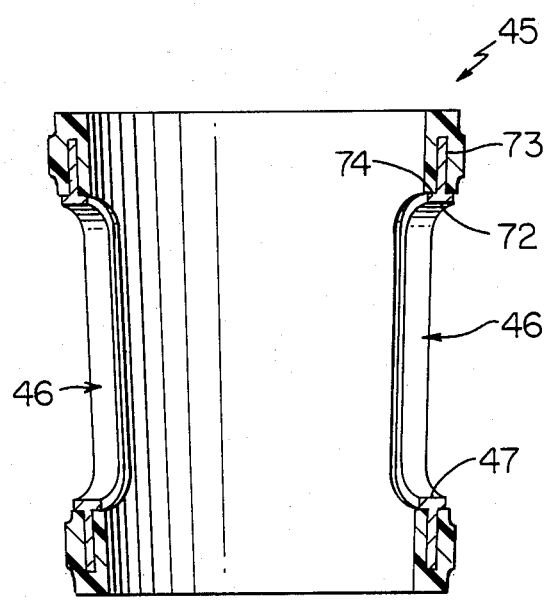
FIG. 9 is a cross-sectional view taken essentially on the line 9—9 of FIG. 8.
Figure 13:
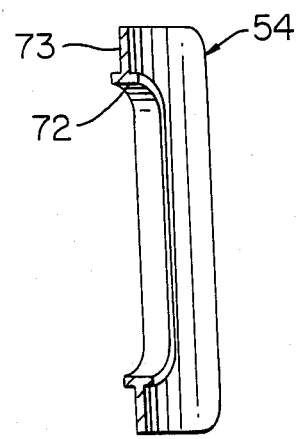
FIG. 13 is a view taken essentially on the line 13—13 of FIG. 12.
Figure 10:
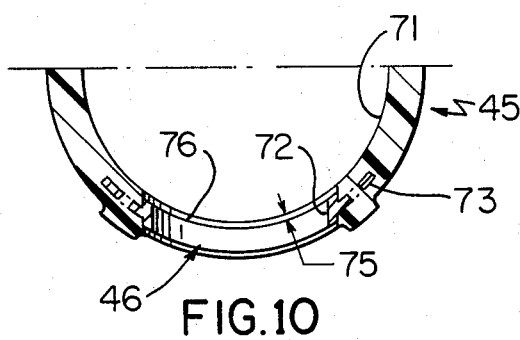
FIG. 10 is a cross-sectional view showing one-half portion of the sleeve and taken essentially on the line 10—10 of FIG. 8.

A modification of the sleeve 45 is illustrated in FIG. 7 of the drawings and in such modification the particular cross-sectional configuration of each annular metal reinforcement is L-shaped having a pair of legs 65 and 66. The leg 66 is embedded in the plastic matrix material P of the sleeve 45 and the other leg 65 is disposed against the annular surface means 47. The leg 65 may be considered as defining a metal liner band for the plastic annular surface means 47 and such metal band has a smooth inside surface 67.

The leg 65 of the metal reinforcement 54 of FIG. 7 is disposed so that it extends radially away from the center of the sleeve. In addition, the dimensional tolerances of the L-shaped reinforcement 54 are such that a space 70 is provided between the inner edge of the leg 65 of such reinforcement 54 and the inside surface 71 of the plastic sleeve 45 whereby with the sleeve 45 of FIG. 7 installed within the bore 42 of the plug valve 35 the outside surface 68 of the plug 50 does not come into contact with the metal reinforcement upon rotating such plug.

Another modification of the reinforced plastic sleeve 45 is illustrated in FIGS. 8 through 13 and in this modification a pair of annular substantially identical metal reinforcements 54 is provided wherein the particular cross-sectional configuration of each is substantially T-shaped. The T-shaped configuration is defined by a cross arm 72 and a leg 73. Each T-shaped metal reinforcement 54 also has elongated aperatures 63 and cutouts 64 previously described in connection with FIG. 6.

The T-shaped metal reinforcement is embedded in the plastic sleeve and the cross arm 72 is disposed so that an inside surface 74 thereof is disposed against the annular surface means 47 of an associated port 46 whereby the cross arm also defines a metal liner band for its annular surface means 47.

The dimensioning and arrangement of the cross arm 72 with embedment of members 54 in the plastic sleeve 45 is such that a space 75 (FIG. 10) is provided between the inner edge 76 of the cross arm 72 and the inside surface 71 of the sleeve 45. Thus, with the sleeve of FIGS. 8–13 disposed in position in the valve 35 the outside surface 68 of the plug 50 will not come into rubbing engagement with the metal reinforcement 54 during rotation of such plug.

Thus, it is seen from the above description that the reinforcing means in the sleeve 45 eliminates any tendency for the plastic sleeve or a portion thereof to be moved within the flow passage 37, prevents cold flow of the plastic sleeve as described above, and minimizes fluid erosion of the sleeve as also described above. In addition, the elimination of metal body lips protruding into the cavity or bore of the valve housing 36 (as would be the case if this were a prior art valve) results in a simpler and less costly body housing.

The valve 35 with its plastic sleeve 45 reinforced using any of the various metal reinforcements disclosed herein, or similar ones, may be expanded or formed to conform to the precise dimensions of the inside surface 55 defining the bore 42 which enables correct sizing of the opening for the plug without machining of the valve housing to close tolerances. Also, prior to expansion of the sleeve 45 the projecting portions 59A and 59B are aligned radially with their corresponding grooves 57 so that when the sleeve 45 is expanded the projecting portions or projections 59A and 59B are urged within the grooves 57 to provide an automatic keying against rotation. Similarly, the grooves 57 in the body or housing 36 may be such that they cooperate with the projecting portions 59A and 59B to enable the sleeve 45 to be readily removed from the bore 42 and a new sleeve installed for easy maintenance. Further, the construction of the valve 35 is such that the absence of metal body lips protruding into the cavity or bore 42 enable the surface defining such bore to be easily machined and a harder or less ductile sleeve material may be used. In addition, regardless of the type of metal used to make the reinforcements or the detailed construction thereof, strengthened ports 46 are provided due to the reinforcements which enable easier removal of the sleeve 45 for maintenance purposes by applying leverage against the material surrounding the ports 46.

The top cover, stem seals, and other standard portions of the valve 35 have not been illustrated or described. However, these components are of types normally provided in a plug type valve and may be of any suitable construction known in the art.

The metal reinforcements may be fixed in position by molding the sleeve therearound. Alternatively, the inserts may be keyed between two concentric plastic sleeves which are suitably fixed together.

The plastic material used to define the sleeve 45 may by any suitable synthetic plastic known in the art. Further, although the reinforcements 54 have been described as made of metal, such reinforcements may be made of any suitable material, including a plastic material which is more rigid and stronger than the plastic material P defining the main body of the sleeve 45.

The groove means or grooves 57 are shown extending radially within the housing 36 from surface 55 and the projecting portions 59A and 59B are shown as extending from the outside surface 56 of the sleeve 45. However, the arrangement of these components may be reversed and grooves may be provided extending radially inwardly from the outside surface 56 of the sleeve 45 and corresponding projections may be provided extending radially inwardly into the bore 42 from the inside surface 55 defining such bore.

As seen in FIG. 1 the bore 42 is a substantially frustoconical bore and has a slight taper toward the bottom of the valve 35 which is generally of the order of 2°. The sleeve 45 and plug 50 have similar frustoconical shapes or tapers. Also, instead of providing four grooves 57 in the top and bottom ledges 58A and 58B and corresponding projecting portions 59A and 59B respectively, any desired number of grooves 57 may be provided in one or both ledges 58A and 58B together with corresponding projecting portions.

It will also be appreciated that the lower ledge 58B in the housing 36 not only has grooves 57 which comprise the means 52 holding the sleeve 45 against rotations but such ledge also serves as a precise stop enabling easier installation of the sleeve 45 within bore 42 of the housing 36.

The sleeve 45 may be made of any suitable material and is preferably formed of a fluorinated hydrocarbon polymer such as polytetrafluoroethylene or equivalent material.

While present exemplary embodiments of this invention and methods of practicing the same, have been illustrated and described, it will be recognized that this invention may be otherwise variously embodied and practiced within the scope of the following claims.

What is claimed is:

1. In a plug valve for controlling fluid flow therethrough said valve having, an outer housing, a flow passage extending through said housing and including an inlet and an outlet interconnected by a bore disposed therebetween, said bore having a central axis disposed substantially perpendicular to said flow passage, a plastic sleeve disposed within said housing and lining said bore, said sleeve having a pair of aligned ports therein at diametrically opposed locations, said ports being aligned with said inlet and outlet to enable fluid flow through said passage, a rotatable plug disposed within said sleeve, said plug having an opening therethrough which is adapted to be aligned in and out of registry with said inlet and outlet in accordance with rotation of said plug relative to said sleeve and housing, and means holding said sleeve against rotation relative to said housing, the improvement wherein said sleeve has substantially rigid reinforcing means embedded therein around each of said ports, said reinforcing means serving the multiple purpose of preventing cold flow of said sleeve adjoining said ports, minimizing fluid erosion of portions of said sleeve adjoining said ports, and increasing the rigidity of said sleeve around each of said ports such that with fluid flow through said valve at high velocity and with said plug rotated to a partially closed position any tendency for said plastic sleeve to be partially moved into said flow passage is substantially eliminated, each of said reinforcing means having a roughly rectangular outer peripheral outline and extending within said sleeve in all directions from around each port, said reinforcing means also having apertures therein with said apertures receiving portions of the plastic sleeve therethrough to firmly embed the reinforcing means in position in said sleeve, said housing having an inside surface and said sleeve having an outside surface, one of said surfaces having groove means therein and the other of said surfaces having projection means extending therefrom, said sleeve being adapted to be expanded and formed radially so that a portion of said projection means is disposed in said groove means, said groove means and said portion of said projection means cooperating to define said holding means and prevent rotation of said sleeve relative to said housing upon rotation of said plug, said groove means comprising a plurality of grooves and said portion of said projection means comprising a plurality of projections corresponding in number to and fitting within said plurality of grooves, said plurality of grooves extending radially in said housing from said inside surface and said projection means extending radially from the outside surface of said sleeve, said projection means comprising a pair of annular pressure rib structures in said sleeve which engage said inside surface of said housing in surrounding relation around the inner parts of said inlet and said outlet, and each of said reinforcing means comprising a reinforcement extending within said sleeve in all directions from around each port such that the reinforcement around each port substantially overlaps an associated annular pressure rib structure.

2. A valve as set forth in claim 1 in which each of said reinforcements is a metal reinforcement.

3. A valve as set forth in claim 2 in which each metal reinforcement is in radially expanded configuration together with said sleeve, having been expanded after disposing said sleeve in said bore to thereby enable sizing of said sleeve to mate precisely with the inner portions of said housing.

4. A valve as set forth in claim 2 in which each of said ports is defined by continuous annular surface means and each metal reinforcement has a particular cross-sectional configuration when viewed on any cross section extending radially from approximately said annular surface means.

5. A valve as set forth in claim 4 in which said particular cross-sectional configuration is rectangular.

6. A valve as set forth in claim 4 in which said particular cross-sectional configuration is substantially L-shaped having a pair of legs, one of said legs being embedded in the plastic matrix defining said sleeve and the other of said legs being disposed against said annular surface means as a continuous metal liner band.

7. A valve as set forth in claim 6 in which said other leg has an annular edge spaced from the inside surface of said sleeve.

8. A valve as set forth in claim 4 in which said particular cross-sectional configuration is substantially T-shaped having a cross arm and a leg, said leg being embedded in the plastic matrix defining said sleeve and said cross arm being disposed against said annular surface means as a continuous metal liner band.

9. A valve as set forth in claim 8 in which said cross arm has an annular edge spaced from the inside surface of said sleeve.

10. In a plug valve for controlling fluid flow therethrough said valve housing, an outer housing, a flow passage extending through said housing and including an inlet and an outlet interconnected by a bore disposed therebetween, said bore having a central axis disposed substantially perpendicular to said flow passage, a plastic sleeve disposed within said housing and lining said bore, said sleeve having a pair of aligned ports therein at diametrically opposed locations, said ports being aligned with said inlet and outlet to enable fluid flow through said passage, a rotatable plug disposed within said sleeve, said plug having an opening therethrough which is adapted to be aligned in and out of registry with said inlet and outlet in accordance with rotation of said plug relative to said sleeve and housing, and means holding said sleeve against rotation relative to said housing, the improvement wherein said bore is a substantially smooth bore throughout practically its entire vertical height, said smooth bore being defined by a frustoconical surface having a pair of diametrically disposed openings therein defining the inner portions of said inlet and outlet, said smooth bore being adapted to receive the outside surface of said sleeve thereagainst, said sleeve having substantially rigid reinforcing means embedded therein around each of said ports, said reinforcing means serving the multiple purpose of preventing cold flow of said sleeve adjoining said ports, minimizing fluid erosion of portions of said sleeve adjoining said ports, and increasing the rigidity of said sleeve around each of said ports such that with fluid flow through said valve at high velocity and with said plug rotated to a partially closed position any tendency for said plastic sleeve to be partially moved into said flow passage is substantially eliminated, each of said reinforcing means having a roughly rectangular outer peripheral outline and extending within said sleeve in all directions from around each port, said reinforcing means also having apertures therein with said apertures receiving portions of the plastic sleeve therethrough to firmly embed the reinforcing means in position in said sleeve, said sleeve having an outside surface and projection means extending radially therefrom, said projection means comprising a pair of annular pressure rib structures in said sleeve which engage said inside surface of said housing in surrounding relation around the inner parts of said inlet and said outlet, and each of said reinforcing means comprising a reinforcement extending within said sleeve in all directions from around each port such that the reinforcement around each port substantially overlaps an associated annular pressure rib structure.

* * * * *